Figure 3:
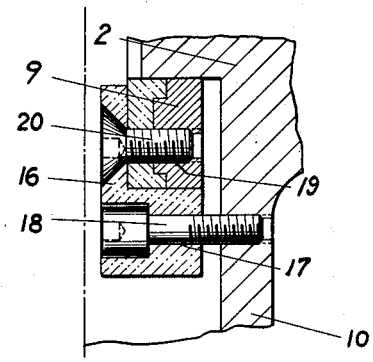

Sept. 1, 1959 H. REICH 2,901,897
ELASTIC COUPLING
Filed June 27, 1958 2 Sheets-Sheet 1
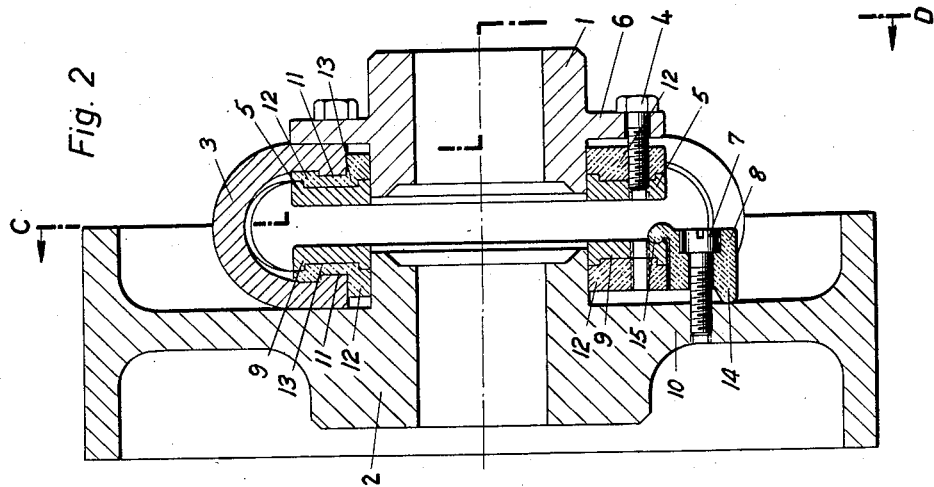
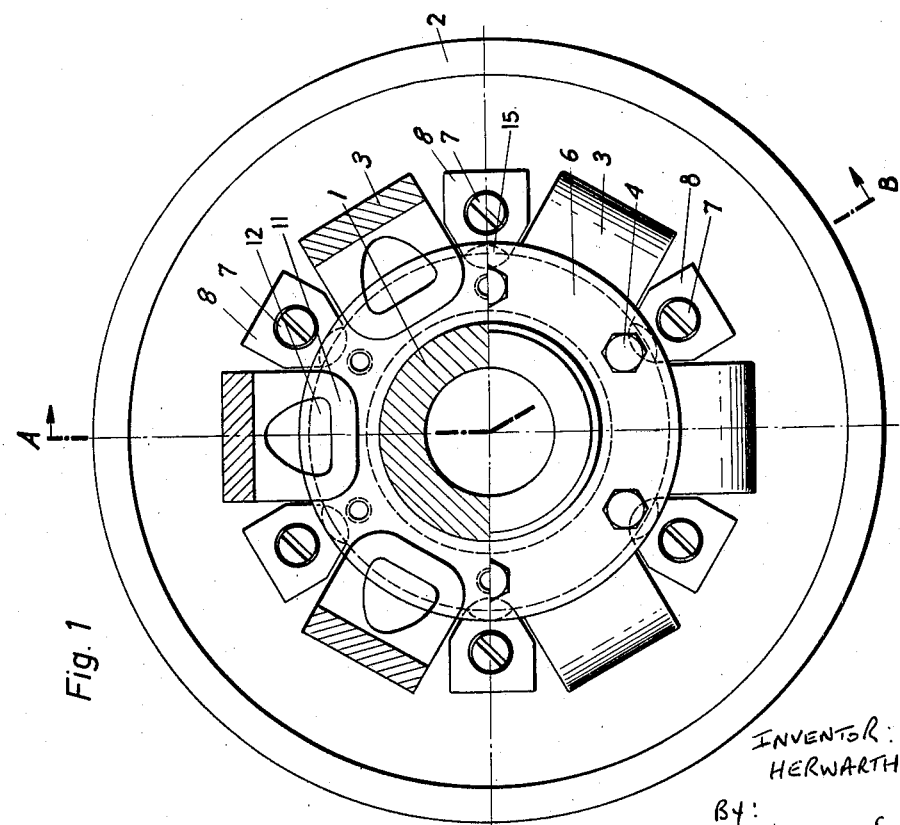
INVENTOR:
HERWARTH REICH
BY: MICHAEL S. STRIKER
ATTORNEY.

United States Patent Office 2,901,897
Patented Sept. 1, 1959

2,901,897

ELASTIC COUPLING

Herwarth Reich, Bochum, Germany

Application June 27, 1958, Serial No. 745,199

Claims priority, application Germany March 31, 1958

6 Claims. (Cl. 64—13)

The present invention relates to an elastic coupling for axially joining two substantially aligned rotatable shafts, by means of a resilient coupling member of arcuate cross section having free end portions peripherally attached to the two shaft ends, and more particularly to attaching means for attaching said coupling member to said shafts.

The resilient coupling member of a coupling of the afore-cited type consists of two annular portions connected along their outer periphery so as to form a ring structure of arcuate or U-shaped cross section having a central yoke element and leg portions extending therefrom towards free edges. These free edges are available for attachment respectively to the two halves of the coupling and thereby to the shafts to be coupled. The resilient coupling member is commonly made of rubber or rubber-like material and is reinforced by strands or layers of fibrous reinforcing material.

Such elastic couplings are either equipped with a single resilient coupling member substantially completely enveloping the joint between the two shafts to be coupled, or with a plurality of segmental resilient members spaced from each other, such as disclosed in my copending application Serial No. 490,073, now Patent No. 2,840,998.

The coupling members are fastened to the shafts by their respective leg portions by means of paired clamping elements concentrically mounted on each shaft and provided with angular grooves engaging mating annular projections of the connecting member. It is relatively difficult and costly to form the clamping members, one of which on each half of the commonly employed coupling is a disc integral with the coupling sleeve or the shaft itself, with such annular grooves which have to be finished very smoothly to avoid damage to the resilient coupling member and which have to be shaped to very close dimensional tolerances. Because of the relatively large forces which are transmitted, the movable pressure plate cooperating with the fixed integral clamping disc as well as the fixed disc itself are commonly made of cast metal. It is not economically feasible to cast these stress-bearing metal elements to the necessary surface finish and close tolerances, and it is costly to machine them to a relatively complex finished shape.

It is, therefore, the principal object of the invention to provide improved attaching means for attaching a resilient connecting member of an elastic coupling to the shafts to be coupled.

Another object is the provision of such attaching means which are simple and inexpensive to manufacture.

Yet another object is the provision of such attaching means in which the stress-bearing elements are of relatively simple shape and easy to form, and the engaging elements of relatively complex shape are substantially free of severe stresses and can therefore be manufactured from a wide choice of materials permitting the selection of inexpensive forming methods.

In its more specific aspects, the invention contemplates the use of discs attached to the shafts and of pressure plates which are bodies of rotation which can readily be produced by turning on a lathe, and particularly an automatic lathe, and to superimpose upon the clamping face of one of said disc and pressure plate an intermediate member having a face conforming to the configuration of the elastic coupling member which is to be fastened to the shaft.

Figure 4:
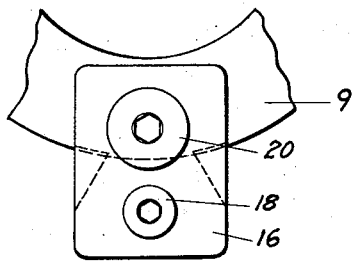

Other objects and many of the attendant advantages of this invention will be readily appreciated as the same becomes better understood by reference to the following detailed description when considered in connection with the accompanying drawings wherein:

Fig. 1 is a front elevation, partly in section on line C—D of Fig. 2, of a preferred embodiment of the invention, Fig. 2 illustrates an axial section of the device of Fig. 1 taken on line A—B of Fig. 1, Fig. 3 is a plan view of a modified detail of Fig. 1, and Fig. 4 is a sectional view of the detail of Fig. 3.

Referring now to the drawing and more particularly to Figs. 1 and 2, there is shown a sleeve 1 of the coupling of the invention connected to the other coupling sleeve 2 by a resilient coupling member 3 of substantially arcuate cross section and having two free edges clamped respectively to the two halves of the coupling. The clamping mechanism on sleeve 1 includes an integral flange or disc 6 connected by means of screws 4 to pressure plate 5 which is axially slidable on sleeve 1. In an analogous manner a flange or disc 10 integral with sleeve 2 and forming part of a flywheel has a coordinated pressure plate 9 axially slidable on sleeve 2 and fastened to flange 10 by means of screws 7 and clamps 8. The two coupling sleeves 1 and 2 as well as the pressure plates 5 and 9 are simple bodies of rotation and are therefore readily and inexpensively shaped by machining on a lathe.

Pressure plates 5 and 9 are formed with shallow annular grooves 13 on their annular surfaces facing the discs 6, and 10 respectively. Annular intermediate members 12 having on one face projections conforming to grooves 13 are superimposed with said one face on the pressure plates 5 and 9. The opposite face of intermediate members 12 which is arranged opposite discs 6, 10 has an irregular configuration corresponding to that of the resilient coupling member 3, a recess 11 in intermediate member 12 accommodating the free edge portion of the coupling member 3. Screws 4 which are freely rotatable in disc 6 and engage mating threads in pressure plate 5 can be tightened to clamp resilient coupling member 3 securely to sleeve 1 and the shaft held therein by pulling the pressure plate 5 with intermediate member 12 toward disc 6.

In an analogous manner screw 7 engages a mating threaded opening in disc 10 for pressing clamp 8 into abutting engagement of its lug 14 with disc 10. Clamp 8 is provided with a catch 15 which axially engages the pressure plate 9 and presses it towards disc 10 when screw 7 is tightened, thus clamping coupling member 3 between disc 10 and pressure plate 9 and its intermediate member 12. A plurality of clamps 8 is arranged peripherally about pressure plate 9 as best seen in Fig. 1.

A third device for securing a pressure plate of the coupling of the invention against the coordinated disc is illustrated in Figs. 3 and 4 in plan view and in section respectively.

There is shown a disc 10 integral with a sleeve 2 and equipped with a clamping mechanism including a pressure plate 9 and an intermediate member 12. Pressure plate 9 is pressed against disc 10 by a clamp 16 fixedly fastened to the pressure disc by a screw 20 which is threaded in both the pressure plate 9 and intermediate member 12 and held to the disc 10 by a screw 18 freely rotatable in opening 17 of clamp 16 and engaging mating threads in an opening in disc 10.

The intermediate member 12 of the coupling of the invention may be formed from a material of relatively low strength since it is subject only to compressive stresses distributed substantially evenly over the entire surface thereof, and to transverse shear stresses distributed over the largest cross sectional area. It has, therefore, been found entirely satisfactory to form the intermediate member from aluminum or other light metals which can be made into complicated shapes at low cost and with a high degree of dimensional precision by diecasting and similar mass-production methods. It has also been found possible to use intermediate members compression molded from filler-reinforced thermosetting phenol-formaldehyde resins and similar plastic material of low resilience, and such intermediate members have shown adequate performance and service life.

The clamps 8 and 16 may equally be manufactured by pressure casting or die-casting to exacting tolerances at very low cost.

In the coupling of the invention, the stress-bearing elements are thus seen to be of simple shape and to require but moderate precision of dimensions. These relatively heavy elements are bodies of rotation and can be cheaply turned to final shape. The clamping element in direct engagement with the resilient coupling member and requiring high precision of dimensions and finish is free of severe stresses, thus permitting a free choice of materials for low-cost forming.

The intermediate element 12 may be fastened to the pressure plates 5, 9 by screws as shown in Fig. 4, but it has been found that soft solder or even adhesive cements will give a satisfactory bond in view of the absence of severe stresses to be withstood.

While in the embodiments illustrated the intermediate member 12 is shown to be superimposed on the pressure plate 5, 9 for clamping of resilient coupling member 3 between opposite faces of the intermediate member and the disc 6, 10, it is obvious that this relationship may be reversed without departing in any way from the spirit and scope of the present invention. It is entirely possible to provide discs 6 or 10 with an annular groove for engagement with mating projections on the intermediate member, and to clamp the resilient coupling member 3 between a suitably shaped face of intermediate member 12 and pressure plate 5, 9.

It will also be understood that the relative position of projections and recesses is not critical. When the pressure plates 5, 9 are formed by lathe turning from a flat piece of material, it will generally be more economical to form a groove therein for engagement with a mating male portion of an intermediate member formed by pressure casting. The reversed arrangement may, however, be employed, the pressure plates 5, 9 being formed with a ridge for engagement with a mating recess in the intermediate member.

The method for clamping the resilient coupling member to discs 6, 10 and thereby to sleeves 1, 2 and to the shafts with which the sleeves are connected will depend on the special configuration of the discs. While the arrangement shown on sleeve 1 of Fig. 2 has the smallest number of individual elements, assembly of a coupling half having elements radially projecting beyond the resilient coupling member, such as the fly wheel shown to be integral with sleeve 2 of Fig. 2, is greatly facilitated by the provision of separate clamp members which permit further outward radial spacing of threaded openings for engagement with the tightening screws 7.

It should be understood, of course, that the foregoing disclosure relates to only preferred embodiments of the invention and that it is intended to cover all changes and modifications of the examples of the invention herein chosen for the purpose of the disclosure which do not constitute departures from the spirit and scope of the invention set forth in the appended claims.

This application is a continuation-in-part of my copending application Serial No. 490,073, filed on February 23, 1955, now Patent No. 2,840,998.

What is claimed and is desired to be protected by Letters Patents of the United States is:

1. An elastic coupling, comprising in combination, two oppositely arranged disc members, at least one of said disc members having a coupling face; a pressure-plate member having a coupling face and arranged with said face spaced from and substantially parallel to the coupling face of said one disc member; an intermediate element having one face conforming to said coupling face of one of said members and superimposed with said face on said coupling face on one of said members, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and means for permanently pressing said members towards each other so as to clamp said coupling member between the coupling face of said other member and the opposite face of said intermediate element.

2. An elastic coupling, comprising in combination, two oppositely arranged disc members, at least one of said disc members having a coupling face; a pressure-plate member having a coupling face and arranged with said face spaced from and substantially parallel to the coupling face of said one disc member, said pressure-plate member and said one disc member having the shape of bodies of rotation; an intermediate element having one face conforming to said coupling face of one of said members and superimposed with said face on said coupling face on one of said members, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and means for permanently pressing said members towards each other so as to clamp said coupling member between the coupling face of said other member and the opposite face of said intermediate element.

3. An elastic coupling, comprising in combination, two oppositely arranged disc members, at least one of said disc members having a coupling face; a pressure-plate member having a coupling face and arranged with said face spaced from and substantially parallel to the coupling face of said one disc member; an intermediate diecast metal element having one face conforming to said coupling face of one of said members and superimposed with said face on said coupling face on one of said members, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and means for permanently pressing said members towards each other so as to clamp said coupling member between the coupling face of said other member and the opposite face of said intermediate element.

4. An elastic coupling, comprising in combination, two oppositely arranged disc members, at least one of said disc members having a coupling face; a pressure-plate member having a coupling face and arranged with said face spaced from and substantially parallel to the coupling face of said one disc member; an intermediate molded plastic element having one face conforming to said coupling face of one of said members and superimposed with said face on said coupling face on one of said members, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and means for permanently pressing said members towards each other so as to clamp said coupling member between the coupling face of said other member and the opposite face of said intermediate element.

5. An elastic coupling, comprising in combination, two oppositely arranged disc members, at least one of said disc members having a coupling face; a pressure-plate member having a coupling face and arranged with said face spaced from and substantially parallel to the coupling face of said one disc member; an intermediate element having one face conforming to said coupling face of one of said members and superimposed with said face on said coupling face on one of said members and fastened thereto by adhesive bonding, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and means for permanently pressing said members towards each other so as to clamp said coupling member between the coupling face of said other member and the opposite face of said intermediate element.

6. An elastic coupling, comprising in combination, two oppositely arranged disc members, at least one of said disc members having a coupling face; a pressure-plate member having a coupling face and arranged with said face spaced from and substantially parallel to the coupling face of said one disc member; an intermediate element having one face conforming to said coupling face of one of said members and superimposed with said face on said coupling face on one of said members, and having an opposite face arranged opposite to and spaced from the coupling face of the other of said members, said opposite face having an irregular configuration; a coupling member of resilient material having an attachment portion located between said coupling face of said other member and said opposite face of said intermediate element, the face of said coupling member facing said opposite face of said intermediate element having a configuration corresponding to and mating with said opposite face; and clamp means for permanently pressing said members towards each other so as to clamp said coupling member between the coupling face of said other member and the opposite face of said intermediate element.

References Cited in the file of this patent

UNITED STATES PATENTS 2,648,958    Schlotmann _____ Aug. 18, 1953

FOREIGN PATENTS 921,183    Germany _____ Dec. 9, 1954